United States Patent
Pupp

Patent Number: 6,062,375
Date of Patent: May 16, 2000

[54] ENDLESS CONVEYOR BELT MOUNTED ON A ROTATABLE DRUM

[75] Inventor: Ingmar Pupp, Lund, Sweden

[73] Assignee: Frigoscandia Equipment AB, Helsingborg, Sweden

[21] Appl. No.: 09/166,562

[22] Filed: Oct. 6, 1998

Related U.S. Application Data

[63] Continuation of application No. PCT/SE97/00592, Apr. 10, 1997.

[30] Foreign Application Priority Data

Apr. 11, 1996 [SE] Sweden ................................. 9601365

[51] Int. Cl.⁷ .................................................... B65G 13/02
[52] U.S. Cl. ............................................................ 198/778
[58] Field of Search ............................................... 198/778

[56] References Cited

U.S. PATENT DOCUMENTS

| | | | |
|---|---|---|---|
| 3,664,487 | 5/1972 | Ballenger | 198/778 |
| 4,893,708 | 1/1990 | Machacek | 198/778 |
| 5,460,260 | 10/1995 | Ochs et al. | 198/778 |

FOREIGN PATENT DOCUMENTS

| | | |
|---|---|---|
| 36339/71 | 6/1973 | Australia. |
| 293 095 | 11/1988 | European Pat. Off.. |
| 453 670 | 10/1991 | European Pat. Off.. |
| 91/04208 | 4/1991 | WIPO. |
| 94/01729 | 1/1994 | WIPO. |
| 95/35250 | 12/1995 | WIPO. |

*Primary Examiner*—Christopher P. Ellis
*Assistant Examiner*—Joe Dillon, Jr.
*Attorney, Agent, or Firm*—Browdy and Neimark

[57] ABSTRACT

A belt conveyor comprises a drum, which is rotatably mounted on a vertical center shaft (4'), and an endless conveyor belt, which along part of its length follows a helical path through several turns around the drum and in contact with the outside of the drum. The drum has a plurality of vertical strips (10), which are distributed around the outside of the drum, engage the conveyor belt through the majority of the turns thereof and are each vertically movable from a starting position in one direction together with the belt through essentially one rotation of the drum and are then successively returnable vertically in the opposite direction to the starting position.

11 Claims, 4 Drawing Sheets

ENDLESS CONVEYOR BELT MOUNTED ON A ROTATABLE DRUM

This application is a continuation application of PCT/SE 97/00592 filed Apr. 10, 1997, and published on Oct. 16, 1997.

BACKGROUND OF THE INVENTION

1. Technical Field of the Invention

The present invention relates to a belt conveyor comprising a drum, which is rotatably mounted on a vertical center shaft, and an endless conveyor belt, which along part of its length follows a helical path through a plurality of turns around the drum and in contact with the outside of the drum.

2. Prior Art

Belt conveyors of this type are used in, e.g., freezing plants. The advancing of the conveyor belt is carried out with the aid of the drum, with the aid of means supporting the lowermost turn of the belt, with the aid of driving rollers outside the drum, or with the aid of a combination of these. Irrespectively of the mode of driving, the belt can along the helical path be subjected to relatively high tensile stress, which may result in the belt abutting hard against the outside of the drum. This in turn results in a considerable friction between the conveyor belt and the drum in respect of the moving of the conveyor belt both in the circumferential direction around the drum and axially along the drum, said friction contributing to an increase of the stress affecting the conveyor belt along the helical path.

Prior art solutions have coped with the circumferential friction only, usually by a positive engagement between the drum and the inside of the conveyor belt along the helical path.

OBJECTS AND SUMMARY OF THE INVENTION

One object of the present invention is to provide a belt conveyor of the type mentioned by way of introduction, which yields a reduction of the stress affecting the conveyor belt along the helical path.

A further object of the invention is to permit such a reduction essentially independently of whether the conveyor belt is supported on separate supporting rails along the helical path or is self-supporting along one or the other side.

By providing the drum with a plurality of vertical strips, which are distributed around the outside of the drum and project radially therefrom, the contact between the conveyor belt through the majority of the turns thereof and the drum is completely located in the strips. By also making each strip vertically movable, the friction in the axial direction between the drum and the conveyor belt is reduced most significantly.

The belt conveyor according to the invention may have a conveyor belt, which adjacent to the drum is supported by a helical supporting rail, as well as a conveyor belt, which adjacent to the drum is self-supporting and supported merely along its lowermost turn around the drum. In the latter case, the strips can advantageously constitute supporting means for the conveyor belt along the helical path and support the conveyor belt merely along the lowermost turn thereof around the drum.

In case the conveyor belt is not self-supporting at its side adjacent to the drum, the strips can be designed to support each turn of the conveyor belt adjacent to the drum.

The conveyor belt can at its side facing away from the drum be supported by a helical rail, which thus supports each of the turns of the conveyor belt, or alternatively be self-supporting and be supported merely along its lowermost turn.

BRIEF DESCRIPTION OF THE DRAWINGS

The invention will now be described in more detail with reference to the accompanying drawings, in which.

DETAILED DESCRIPTION OF THE PREFERRED EMBODIMENT(s) OF THE INVENTION

Figure 1:
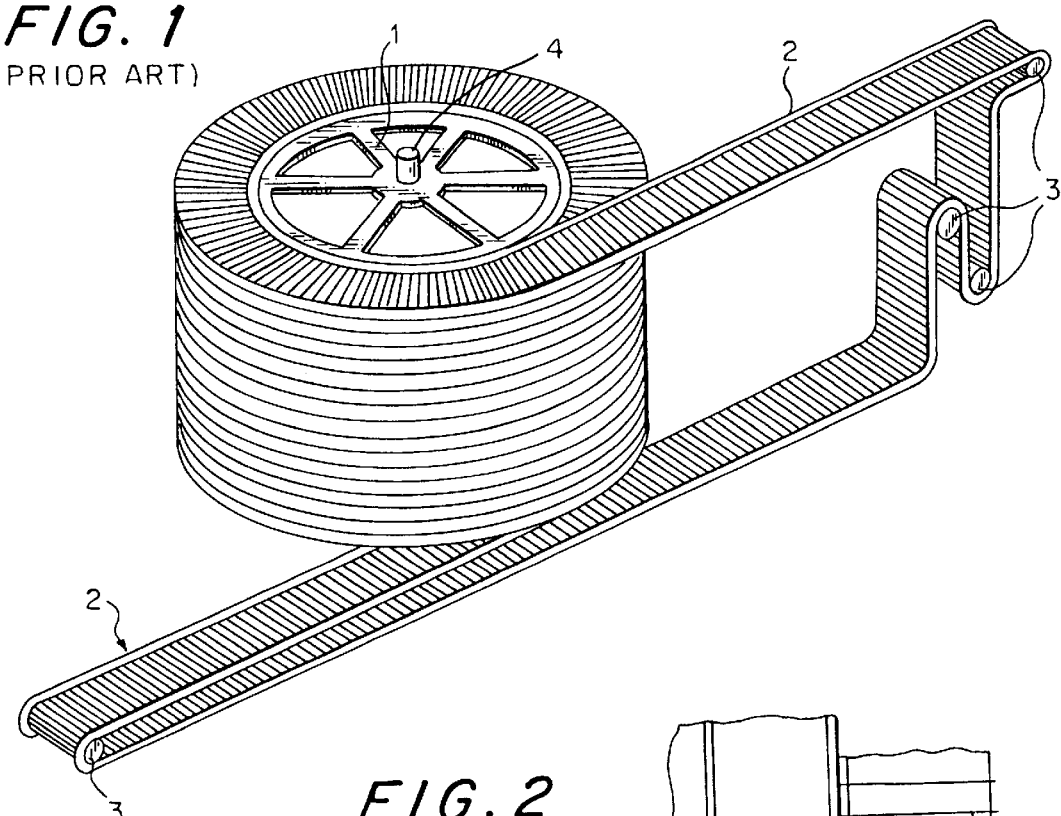
FIG. 1 is a perspective view and shows an example of a conventional belt conveyor, to which the present invention is applicable.

A belt conveyor o f the type which the present invention concerns, as shown in FIG. 1, can be used for conveying, for instance, foodstuffs into, through, and out of a housing, in which the foodstuffs are treated, for instance frozen. As generally shown in FIG. 1, the belt conveyor comprises in prior art manner a drum 1, a conveyor belt 2, and a plurality of guide rollers 3 or the like. The drum 1 is rotatably mounted on a vertical center shaft 4, and the conveyor belt 2 follows along part of its length a helical path through several turns around the drum 1 and engages the outside thereof. Along the remaining part of its length, the conveyor belt 2 follows a return path, which is determined by the guide rollers 3.

The conveyor belt 2 can move either upwards or downwards around the drum. It can be supported in various ways to be able to follow the helical path around the drum, as exemplified in FIGS. 2–4.

Figure 2:
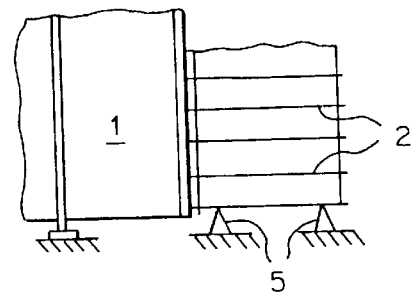
FIGS. 2, 3, and 4 respectively illustrate schematically various conventional ways of supporting a conveyor belt around a drum.

In FIG. 2, the belt is of the self-supporting type, i.e., each superjacent turn is supported by another subjacent turn, and merely the lowermost turn requires an external base in the form of, e.g., rails 5, as illustrated, or a trolley train or chains.

Figure 3:
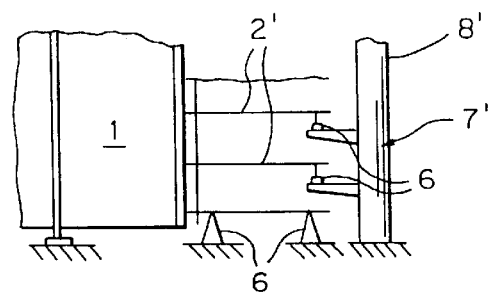

In FIG. 3, the belt 2' is of the self-supporting type at its side facing the drum 1', but at its side facing away from the drum 1', it is supported by a rail 6, which extends through all the turns of the belt 2' around the drum 1'. The rail 6 is in turn supported by an exteriorly positioned frame 7' having a plurality of rods 8'. The rail 6 also supports the lowermost turn of the conveyor belt 2.

Figure 4:
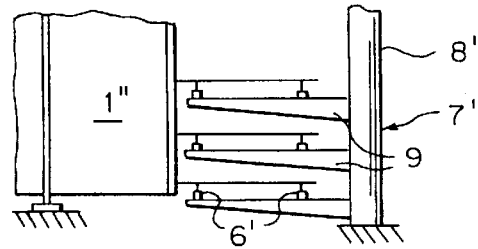

In FIG. 4, the belt 1" is supported by rails 6' both at its inner side and its outer side. The rail 6' is at its inner side supported, via arms 9, by the exteriorly positioned frame 7' with the rods 8'.

It will be appreciated that if the conveyor belt 2 in FIG. 1 makes contact with the outside of the drum 1, it will, while moving along the helical path, accompany, without friction, the drum 1 in the circumferential direction around the drum, merely if the contact between the drum 1 and the conveyor belt 2 involves a driving engagement. The simultaneous movement of the conveyor belt 2 axially up or down the outside of the drum 1, however, has up to now always taken place under friction owing to a mutual sliding movement between the conveyor belt 2 and the drum 1 in this direction. This friction may cause undesired stress in the conveyor belt 2 and is therefore eliminated almost completely according to the present invention, as will be described below.

Figure 5:
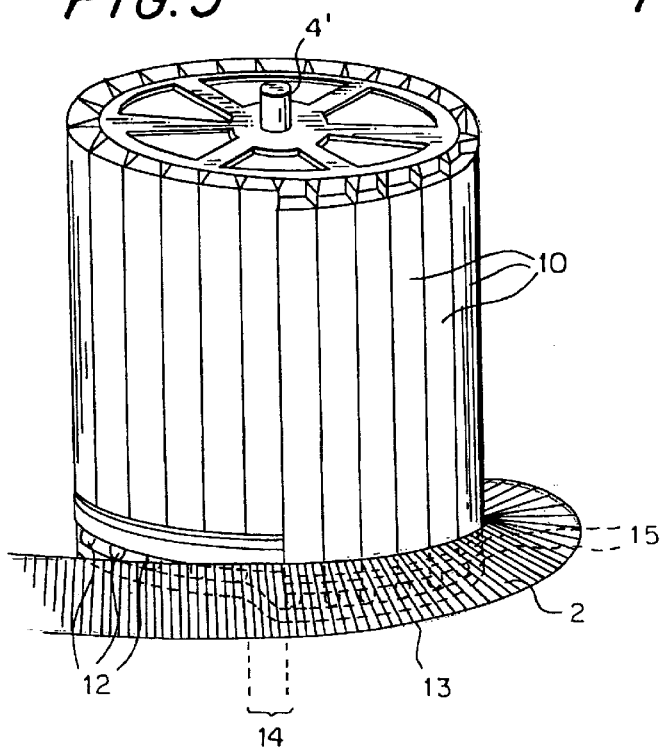
FIG. 5 is a schematic perspective view of a drum in a belt conveyor according to the present invention.
Figure 6:
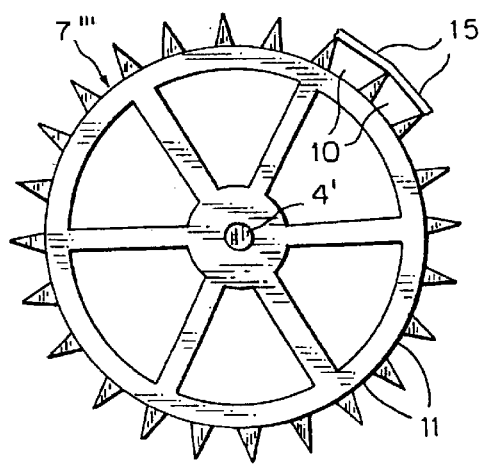
FIG. 6 is a schematic top plan view of the drum in FIG. 5.

A drum 1''' as shown in FIGS. 5 and 6 has a plurality of strips 10 around its outside, said strips 10 extending axially along the drum 1''' and are arranged in grooves 11 so as to move axially relative to the drum 1'''. As shown in FIG. 6, the grooves 11 may expand radially outwards, since the strips 10 can be kept in place by the conveyor belt 2 which is helically wound around the drum 1 in contact with the strips 10.

Each strip 10 has at its lower end a rotatably mounted roller 12 which rests on a guide means 13. The guide means 13 extends around the drum and supports all the strips 10 via the respective rollers 12. Around the major part of the circumference of the drum 1''', the guide means 13 has a pitch which conforms with the pitch of the conveyor belt 2 along the helical path around the drum 1'''. Over a small angular area 14 around the shaft 4' of the drum 1', the guide means 13 bridges the pitch through one turn, such that the guide means 13 forms a closed path for the rollers 12.

At its end closest to the rollers 12, each strip 10 further has a supporting lug 15, which projects radially from the strip 10. The drum illustrated in FIGS. 5 and 6 thus is not intended for a conveyor belt of the type as shown in FIG. 2 or FIG. 3, i.e., a conveyor belt which is self-supporting at least on the side facing the drum.

Figure 10:
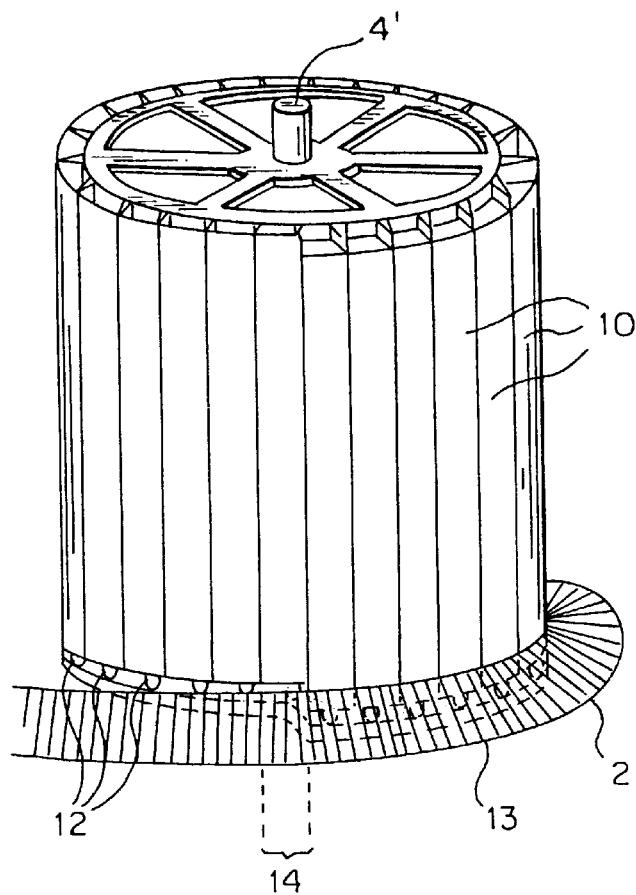
FIG. 10 is a schematic perspective view of an alternative embodiment according to the invention of the drum of claim 5.
Figure 11:
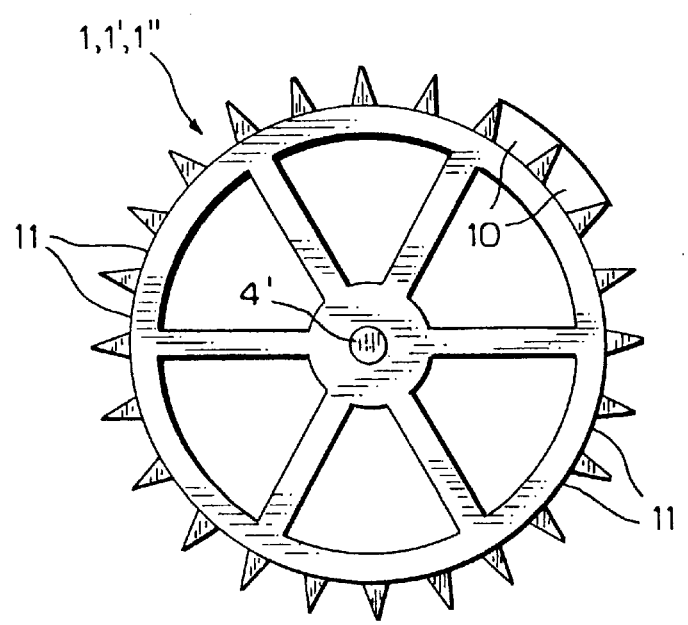
FIG. 11 is a schematic top plain view of the drum in FIG. 10.

If the lugs 15 are excluded from the embodiment shown in FIGS. 5 and 6, as shown in FIGS. 10 and 11, the drums shown therein will be suited for conveyor belts of all the types shown is FIGS. 2–4.

Figure 7:
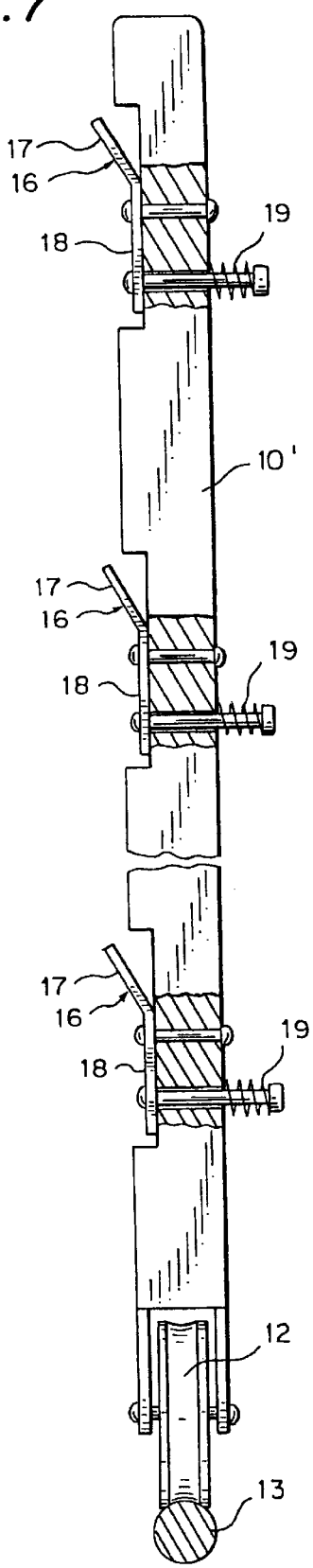
FIG. 7 is a side view of an embodiment of a strip, a plurality of which can be supported by the drum in FIGS. 2–5.

FIG. 7 shows one more embodiment of the strip 10 in FIG. 5. More specifically, the strip 10' shown in FIG. 7 has a plurality of lugs 16; one lug 16 for each turn of the conveyor belt along the helical path. A drum with a plurality of strips 10' according to FIG. 7 is thus intended for a conveyor belt, which is not self-supporting at its side facing the drum, whereas at its side facing away from the drum, it can either be self-supporting, as shown in FIG. 2, or supported by a rail, as shown is FIGS. 3 and 4.

To permit the axial displacement of the strips 10' in the angular area, the lugs 16 are, in the embodiment according to FIG. 7, foldable towards the strip 10', such that the lugs 16 are pressed inwards by the inside of the conveyor belt in the successive pushing down of the respective strips 10' in the angular area. As shown in FIG. 7, each lug 16 has more specifically the shape of a lever, which is pivotally mounted on a horizontal shaft, which essentially constitutes a tangent of the drum. Each lever has a projecting part 17 above the pivot shaft and a substantially perpendicular lower part 18 below the pivot shaft, said lower part 18 being biased against the strip 10' by means of a spring 19. The projecting upper parts 17 engage under the conveyor belt at the side thereof facing the drum in a plurality of points along each turn of the conveyor belt around the drum.

When a strip 10' passes through the angular area, the guide means or a corresponding guide means at the top of the drum moves the strip 10' downwards a distance corresponding to the pitch of the conveyor belt through one turn along the helical path around the drum. In this connection, the projecting parts 17 of the lugs 16 will first move out of engagement with the respective turns of the conveyor belt, and then be pressed inwards against the strip 10' by the inner edge of the subjacent turn of the conveyor belt. After passing the associated subjacent turn, the projecting part 17 once more snaps out owing to the action of the spring 19 and will thus support the conveyor belt in points one turn lower than before entering the angular area.

Figure 8:
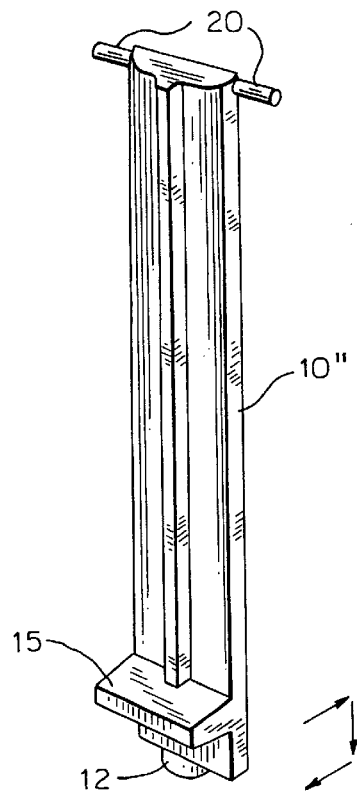
FIG. 8 is a perspective view of an alternative embodiment of the strip in FIGS. 5 and 6.

FIG. 8 illustrates a further embodiment of the strip 10 in FIGS. 5 and 6. The strip 10" shown in FIG. 8 is at its upper end arranged to be on the one hand vertically displaceable, like the strips 10 and 10', and, on the other hand, to be pivotable about a horizontal shaft, which essentially is a tangent of the drum. This is accomplished by the strip 10" at its upper end having opposed pins 20, which engage in axial slots (not shown) in the upper part of the drum. Like the strips 10 and 10', the strip 10" has a roller 12, which is guided by a guide means (not shown). This guide means has the same appearance as the guide means 13 in FIG. 5 except in the angular area, where this guide means also deviates inwardly towards the center shaft of the drum. Like the strip 10, the strip 10" further has a lug 15 for supporting the inside of the lower turn of a conveyor belt, which at its side facing the drum is self-supporting.

As indicated by arrows in FIG. 8, the strip 10", when passing the angular area, will perform with its lower end a movement inwards, downwards and again outwards, whereby the lug 15' disengages the underside of the conveyor belt at the upper end of the lowermost turn and engages the underside of the lower end of the lowermost turn of the conveyor belt around the drum.

Figure 9:
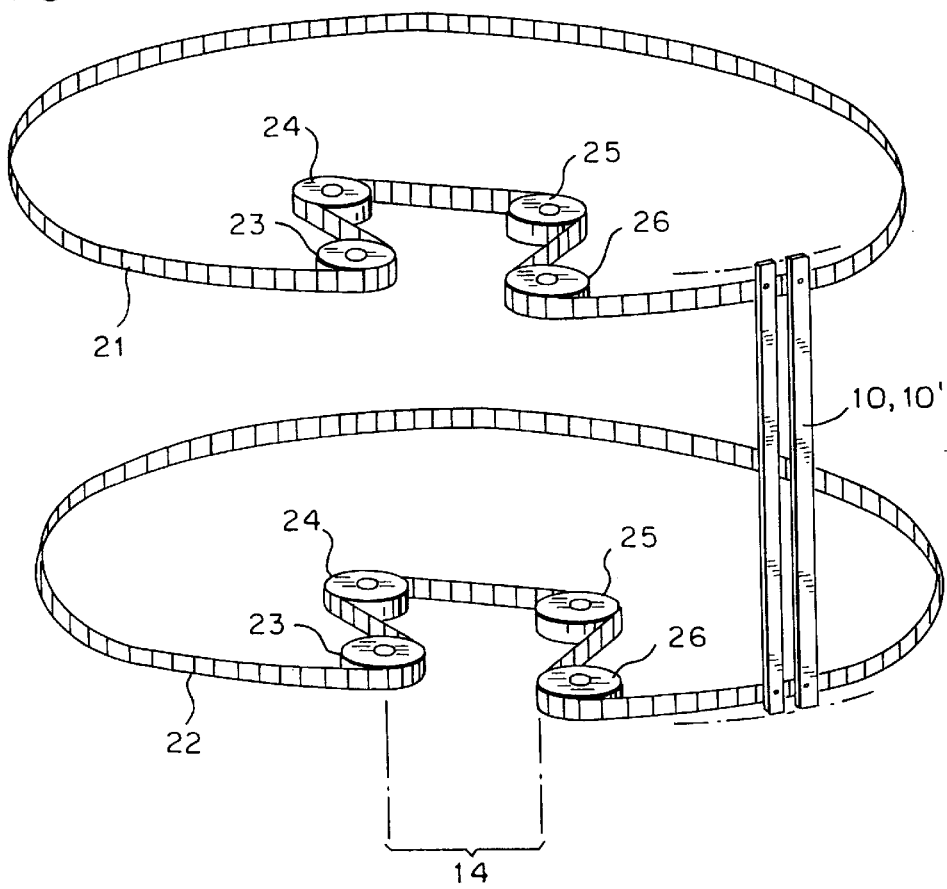
FIG. 9 is a perspective view of an alternative to a conventional drum.

FIG. 9 illustrates two chains 21 and 22, which are adapted to support the strips 10, 10' directly and, thus, can be considered an alternative embodiment of the drum 1. Each chain 21, 22 is mounted to follow a path, which completely conforms with the guide means 13 outside the area 14'. In this area, each chain 21, 22 is moved downwards a distance which is essentially equal to the pitch of the conveyor belt through one turn. This is accomplished by means of four guide rollers 23–26 for each chain 21, 22. The chains are driven synchronously in some suitable fashion, and the strips 10, 10' are disengaged from the chains 21, 22 at the beginning of the area 14' and are again connected to the chains 21, 22 at the end of the angular area 14'.

Further modifications of the above-described embodiments of the belt conveyor are obviously possible within the scope of invention. For instance, one more guide means can be arranged to positively guide the strip 10, 10', 10" downwards in the angular area. Moreover, the entire strip 10" in FIG. 8 can be made to follow the movement pattern indicated by arrows, i.e., without pivoting about the pins 20. In the embodiment according to FIG. 9, the strips 10, 10' can be supported by the chains 21, 22 only, or by means of roller and a guide means.

The invention claimed is:

1. A belt conveyor comprising a drum, which is rotatably mounted on a vertical center shaft (4'), an endless conveyor belt (2), having a length which along part of the length thereof follows a helical path through a plurality of turns around the drum and in contact with an outside of the drum, and a plurality of vertical strips (10, 10', 10"), which are distributed around the outside of the drum, engaging the conveyor belt (2) through a majority of the turns thereof and each being vertically moveable from a starting position in one direction together with the belt during essentially one rotation of the drum and are then successively returnable vertically in an opposite direction to the starting position.

2. A belt conveyor as claimed in claim 1, wherein a supporting rail (6) supports the conveyor belt (2) adjacent the drum.

3. A belt conveyor as claimed in claim 1, wherein a rail (6) supports the conveyor belt (2) at a side thereof facing away from the drum.

4. A belt conveyor as claimed in claim 1, wherein the conveyor belt (2) at a side thereof facing away from the drum is self-supporting and supported only along a lowermost turn thereof.

5. A belt conveyor as claimed in claim 1, wherein each of the strips (10, 10', 10") at a lower end thereof has a roller, which is controlled to follow a guide means, which determines a vertical position of the roller and thus of the strip thereof.

6. A belt conveyor as claimed in claim 1, wherein the drum consists of upper and lower chains (21, 22).

7. A belt conveyor as claimed in claim 1, wherein the strips (10') support every turn of the conveyor belt (2) adjacent to the drum.

8. A belt conveyor as claimed in claim 7, wherein each strip (10') has a folding flap (16) for each turn of the conveyor belt (2).

9. A belt conveyor as claimed in claim 1, wherein the conveyor belt (2), adjacent to the drum, is self-supporting and supported only along a lowermost turn thereof around the drum.

10. A belt conveyor as claimed in claim 9, wherein the strips (10, 10") support the lowermost turn of the conveyor belt (2).

11. A belt conveyor as claimed in claim 10, wherein the strips (10, 10") each have a flap (15, 15') for supporting the lowermost turn of the conveyor belt (2).

* * * * *